Patented July 15, 1924.

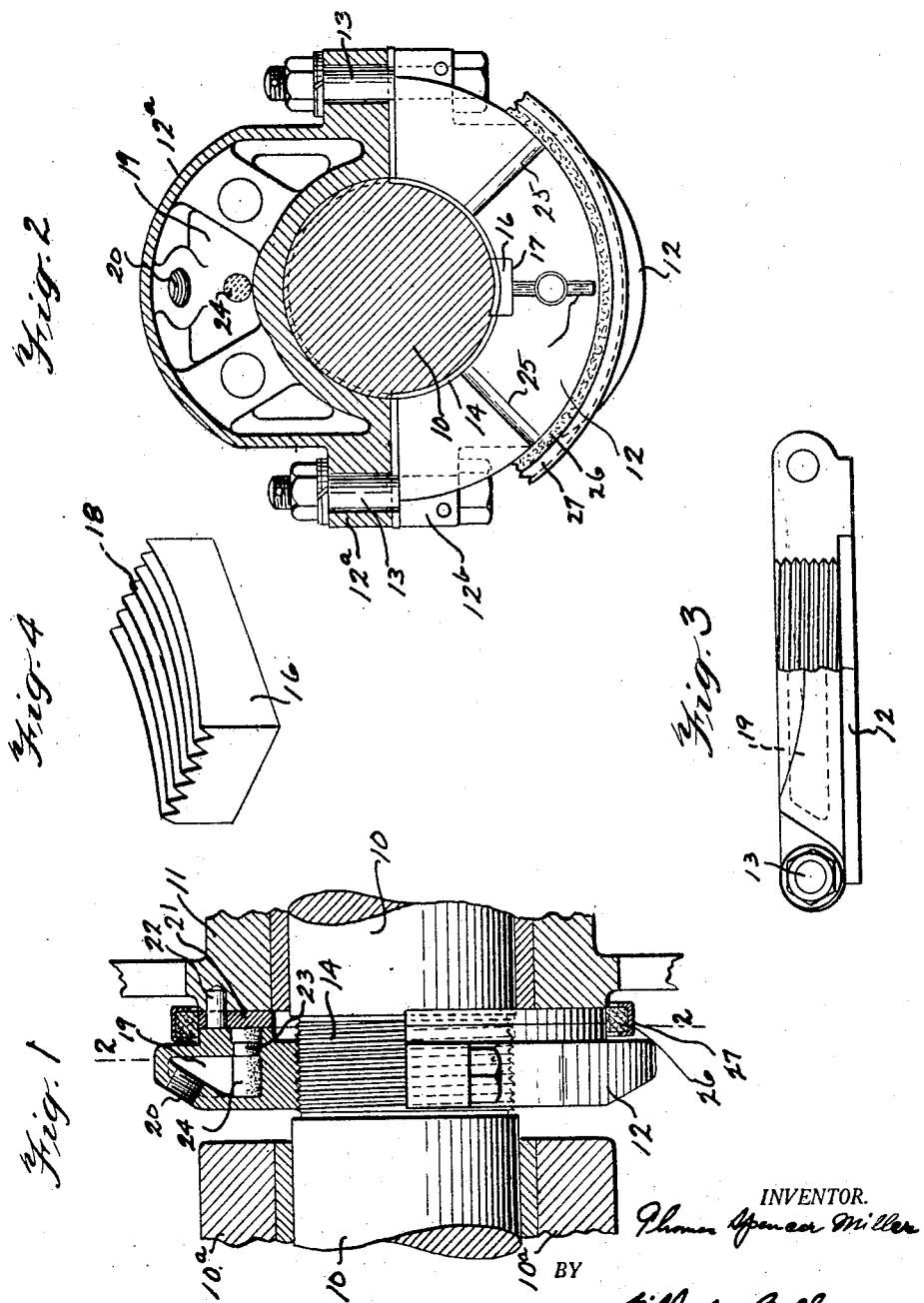

1,501,614

UNITED STATES PATENT OFFICE.

THOMAS SPENCER MILLER, OF SOUTH ORANGE, NEW JERSEY.

ADJUSTABLE THRUST BEARING.

Application filed July 7, 1922. Serial No. 573,500.

*To all whom it may concern:*

Be it known that I, THOMAS SPENCER MILLER, a citizen of the United States, residing at South Orange, in the county of Essex and State of New Jersey, have invented certain new and useful Improvements in Adjustable Thrust Bearings, of which the following is a specification.

My invention will best be understood by reference to the accompanying drawings, in which Figure 1 is a longitudinal section, partially in elevation, showing one embodiment of my invention; Fig. 2 is a cross-section, taken along the line 2—2 of Fig. 1; Fig. 3 is a plan view, partly in section, of one of the parts, and Fig. 4 is a perspective view of a threaded, concave key used in the illustrative embodiment.

Referring, now, to the drawings, a shaft 10 is supported in suitable bearings, one of which is shown at 10ª. On shaft 10 is loosely mounted a member 11, such as a drum, gear or pulley, which is subjected to pressure tending to move it toward the left of Fig. 1. To resist this thrust, I provide a novel form of thrust bearing which, in the illustrative embodiment, is an adjustable self-lubricating collar 12 secured to the shaft and cooperating with the member 11 to permit rotary movement of the latter with respect to the collar, but to prevent longitudinal movement thereof.

The clamping collar or thrust bearing 12 is formed in two or more parts 12ª and 12ᵇ, which are, in general, alike, the two parts being secured together by clamping bolts 13. The portion of the shaft to which the clamping collar is secured is threaded, as at 14, and the clamping collar 12 is correspondingly internally threaded to engage the screw threads 14 on the shaft. The clamping action of the collar 12 may be assisted by a screw-threaded, concave key 16, which is preferably of the form best shown in Fig. 4, the key being seated in a recess 17 extending through one of the parts 12ᵇ of the clamping collar 12. The key 16 is threaded at 18 on the surface engaging the threaded portion 14 of the shaft 10, the threads preferably being of the same pitch and size as the threads 14, but preferably being struck to a slightly less radius so that the ends thereof, when clamped against the shaft, will slightly bite into the same.

The collar 12 may be adjusted, as desired, along the threaded portion of the shaft 10. When it is desired to change the position thereof, the bolts 13 are slightly loosened so as to relieve the compression against the shaft and against the key 16, and the adjustment is made by rotating the collar. When the desired adjustment is obtained, the collar 12 is secured by again clamping the parts 12ª and 12ᵇ together through the bolts 13, thus binding the threads 15 on the threads 14, and, in addition, forcing the threads of the key 16 into the threads 14.

Provision may also be made for oiling the thrust bearing. In the illustrative form, both parts of the collar are preferably formed with chambers 19, a tapped opening 20 being provided in each half for the introduction of lubricating material and closed by a suitable plug. A thrust ring 21 may be provided between the end of the member 11 and the face of the collar 12 and attached to the member 11 by pins 22. An opening 23 in each half of the collar leads from the chamber 19 to the face contacting with ring 21, and lubricant is transmitted from the chamber 19 to the thrust surface of the collar 12 by a wicking 24, preferably formed of felt, which carries the lubricating material by capillary attraction, a portion of the wicking contacting with the face of the thrust ring 21. Preferably, each chamber 19 is formed with only one opening 23, as I have found that the provision of more than one opening causes an undue amount of lubricant to flow from the chamber to the bearing surface, the additional opening permitting the entrance of air to the chamber while the lubricant passes out of the other opening. Preferably, the openings 23 in the two halves are placed at different distances from the center of the shaft so as to lubricate a larger area of the bearing surface. Each half of the collar is provided with one or more grooves 25 extending across the bearing surface and leading from the inside to the periphery of the bearing surface of the collar. These grooves are provided for better distributing the lubricating material and also for receiving any dust or particles resulting from the wear between the bearing surfaces, and thereby prevent scouring, which would be occasioned by the presence of such dust or particles. Surrounding the outer end of the bearing surface between the friction disk 21 and the collar 12 is a ring 26 of absorbent material, such as felt, arranged to receive the lubricant which works its way across the bearing surface to the outer edge thereof and also through the grooves 25. This ring of absorbent material may be held in place in any convenient manner, as by the ring 27 which, in the form shown, is metal and channel-shaped in cross-section. The ring 27 and the felt 26 may be attached to the parts or may be free to rotate independently of any of the parts.

Preferably, I make the two parts of the bearing surface of dissimilar metals, such as steel and bronze, cast-iron and bronze, or the like. Since in the form illustrated, the ring 21 is continuous, whereas the collar 12 is split, I prefer to make the collar 12 of the softer material and the ring 21 of the harder material, in order that the joint formed by splitting the collar 12 may not act as a cutting surface against the ring 21. It will be understood that, in manufacturing, the joint between the parts 12$^a$ and 12$^b$ may not be perfectly formed, so that the face of one may project slightly beyond the face of the other. This would produce a cutting edge, but since, in my arrangement, such edge is formed on the softer parts, this will not cut the harder ring 21.

In use, lubricant will pass from the chambers 19 through the wicks 24 and will find its way by centrifugal action, assisted by the grooves 25, across the entire face of the bearing, any surplus lubricant being received in the felt 26 together with the particles which may be caught in the grooves 25, and which will be worked outward by centrifugal force as well as by the flow of the lubricant. The felt 26 serves not only to catch the surplus lubricant passing across the face of the bearing, but also keeps the bearing surface free from dust from the outside, and also serves to return a certain amount of the lubricant to the bearing surface when the bearing is stationary.

While the key 16 may be of any suitable material, preferably it would be made of a material harder than the threads 14 on the shaft 10 so as to insure a biting action between the two. While preferably, I provide a separate thrust ring 21, it will be understood that the thrust surface may be formed integral with the member 11.

It will be understood that the specific embodiment shown in the drawings is merely illustrative, and that my invention may be varied within wide limits. It will also be understood that certain features of my invention may be used independently of other features.

I claim:

1. In a device of the character described, a shaft having a threaded portion, a member on the shaft and subjected to pressure tending to move it longitudinally of the shaft, an internally threaded thrust collar engaging the threads of the shaft, a key in the collar having threads adapted to engage the threads of the shaft, and means to press the threads of the key into the threads of the shaft.

2. In a device of the character described, a shaft having a threaded portion, a member on the shaft and subjected to pressure tending to move it longitudinally of the shaft, an internally threaded thrust collar engaging the threads of the shaft, a key in the collar having threads adapted to engage the threads of the shaft, the threads of the key having an internal radius smaller than the radius of the threads of the shaft, and means to press the threads of the key into the threads of the shaft.

3. In a device of the character described, a shaft having a threaded portion, a member on the shaft and subjected to pressure tending to move it longitudinally of the shaft, an internally threaded thrust collar divided into segments with the threads of the collar adapted to engage the threads of the shaft, a key in the collar having threads adapted to engage the threads of the shaft, and means to draw the segments of the collar together to press the threads thereof and the threads of the key into the threads of the shaft.

4. In a device of the character described, a shaft having a threaded portion, a member on the shaft and subjected to pressure tending to move it longitudinally of the shaft, an internally threaded thrust collar divided into segments with the threads of the collar adapted to engage the threads of the shaft, a key in the collar having threads adapted to engage the threads of the shaft, the threads of the key having an internal radius smaller than the radius of the threads of the shaft, and means to draw the segments of the collar together to press the threads thereof and the threads of the key into the threads of the shaft.

5. In a device of the character described, a shaft having a threaded portion, a member on the shaft and subjected to pressure tending to move it longitudinally of the shaft, a continuous thrust ring of relatively hard metal on the end of said member, a thrust collar of relatively soft metal divided into segments and having internal threads adapted to engage the threads of the shaft, a key in the collar having threads adapted to engage the threads of the shaft, and means to draw the segments of the collar together to press the threads thereof and the threads of the key into the threads of the shaft.

6. In a device of the character described, a shaft having a threaded portion, a member on the shaft and subjected to pressure tending to move it longitudinally of the shaft, a continuous thrust ring of relatively hard metal on the end of said member, a thrust collar of relatively soft metal divided into segments and having internal threads adapted to engage the threads of the shaft, a key in the collar having threads adapted to engage the threads of the shaft and having an internal radius smaller than the radius of the threads of the shaft, and means to draw the segments of the collar together to press the threads thereof and the threads of the key into the threads of the shaft.

7. In a device of the character described, a shaft, a member on the shaft and subjected to pressure tending to move it longitudinally of the shaft, said member having a thrust surface of relatively hard metal on the end thereof, a thrust collar composed of segments of relatively soft metal and arranged to be clamped adjustably on the shaft with its face against the thrust surface of said member, said collar having a lubricant chamber therein with an opening leading from the chamber to the face of the collar in contact with the thrust surface of said member, and wicking in said opening with a portion thereof in contact with said thrust surface, said collar having grooves extending across the face thereof in contact with said thrust surface.

8. In a device of the character described, a shaft, a member on the shaft and subjected to pressure tending to move it longitudinally of the shaft, said member having a thrust surface of relatively hard metal on the end thereof, a thrust collar composed of segments of relatively soft metal and arranged to be clamped adjustably on the shaft with its face against the thrust surface of said member, said collar having a lubricant chamber therein with an opening leading from the chamber to the face of the collar in contact with the thrust surface of said member, wicking in said opening with a portion thereof in contact with said thrust surface, said collar having grooves extending across the face thereof in contact with said thrust surface, and a ring of wicking surrounding the outer periphery of the contacting faces of said collar and said member.

9. In a device of the character described, a shaft, a member on the shaft and subjected to pressure tending to move it longitudinally of the shaft, said member having a thrust surface of relatively hard metal on the end thereof, a thrust collar composed of segments of relatively soft metal and arranged to be clamped adjustably on the shaft with its face against the thrust surface of said member, said collar having a plurality of lubricant chambers therein, each with an opening leading from the chamber to the face of the collar in contact with the thrust surface of said member, and wicking in each of said openings with a portion thereof in contact with said thrust surface, the several openings being disposed at different radial distances from the center of the shaft.

THOMAS SPENCER MILLER.